US008155244B2

(12) United States Patent
Ray

(10) Patent No.: US 8,155,244 B2
(45) Date of Patent: Apr. 10, 2012

(54) DEMODULATION USING BLIND CONSTELLATION IDENTIFICATION FOR COMMUNICATION SIGNALS

(75) Inventor: Gary Alan Ray, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 943 days.

(21) Appl. No.: 12/169,511

(22) Filed: Jul. 8, 2008

(65) Prior Publication Data

US 2010/0008450 A1  Jan. 14, 2010

(51) Int. Cl.
 *H04L 27/06* (2006.01)
(52) U.S. Cl. ........ 375/340; 375/232; 375/260; 375/355; 370/208; 370/252; 455/65; 455/296
(58) Field of Classification Search .................. 375/232, 375/233, 260, 316, 326, 340, 355; 370/208, 370/252; 455/182.2, 252
See application file for complete search history.

(56) References Cited

U.S. PATENT DOCUMENTS 6,115,433 A * 9/2000 de Lantremange ........... 375/326
7,031,405 B1 * 4/2006 Touzni et al. ................. 375/326

OTHER PUBLICATIONS

Georghiades et al. "Blind Carrier Phase Acquisitions for QAM Constellations", IEEE Transactions on Communications, vol. 45, No. 11, Nov. 1997.*

* cited by examiner

*Primary Examiner* — Khanh C Tran
*Assistant Examiner* — Fitwi Hailegiorgis
(74) *Attorney, Agent, or Firm* — Caven & Aghevli LLC

(57) ABSTRACT

A receiver and a method to demodulate an unknown signal with an unknown linear modulation is described. The method of one of various embodiments comprises: sampling the unknown signal at a sampling rate to produce a sampled signal; applying carrier frequency offset estimation to the sampled signal to match the frequency of the sampled signal to that of the unknown signal and to change constellation rotation of the sampled signal; utilizing symbol period estimation to match the sampling rate of the sampled signal to a sampling rate of the unknown signal; applying blind equalization to the sampled signal to provide an equalized unknown signal; and demodulating the equalized unknown signal by utilizing a multistep windowed histogram clustering algorithm to generate constellation clusters; applying a rotation rate estimation algorithm to the clusters to estimate a phase rotation rate; and utilizing the phase rotation rate estimate to de-rotate the clusters.

15 Claims, 7 Drawing Sheets

DEMODULATION USING BLIND CONSTELLATION IDENTIFICATION FOR COMMUNICATION SIGNALS

FIELD

The present disclosure relates to communications systems, in general, and to an ad-hoc wireless communication method and system, in particular.

BACKGROUND

Ad-hoc wireless networks are increasingly becoming important. Much of the work with respect to such networks has been in the area of protocols, but there are important areas that have to do with the physical layer. When an ad-hoc network comprises heterogeneous nodes, each node can use a different modulation, each with a correspondingly different constellation in In-Phase, Quadrature (IQ) space.

There are many reasons for considering such ad-hoc or "multi-drop" networks. One reason is that it would be much easier for an existing point-to-point physical link to join such an ad-hoc network if constellation identification was completely automatic. Thus all the possible constellations would not have to be designed into each node before operation; each node would adapt to the physical layer presented to it from its neighbors. A second reason is that most of the time, synchronization is done using training sequences with a synchronized cooperation between the transmitter and receiver. A third reason is that the physical layer of newly designed nodes in such an ad-hoc network with blind constellation identification could more easily use the most optimal communications channel modulation and coding tricks to efficiently use the available RF spectrum at the required power levels for the desired data rate.

Two standard approaches to constellation classification have been a pattern-recognition or feature-extraction approach, and a non-linearity evaluation and filtering approach.

The first approach relies on a classical concept of "feature" in a feature space, such as a cluster of IQ points. The second approach is based on the observation that raising a signal to an appropriate power and filtering at the right spectral band produces different levels of power depending on the modulation type. The first method is much more targeted and works on general constellations, whereas the second method relies on pre-computed characterizations of particular types of standard constellation sets like Quadrature Phase Shift Keying (QPSK), 8-symbol Phase Shift Keying (8-PSK), 16-symbol Quadrature Amplitude Modulation (16-QAM), etc.

A radon transform method assumes a specific periodic structure to the constellation, while clustering methods apply to general transforms. However, these methods do not easily discover the exact set of symbols in IQ space without some effort in setting thresholds that are sensitive to many parameters of the received signal and constellation type. Also when the signal/noise ratio is too low, the clustering methods fail in very non-uniform ways.

SUMMARY

According to various embodiments of the invention an unknown signal with an unknown linear modulation is demodulated. The various embodiments have the capability of blind constellation identification of an unknown communications signal and can adapt to both carrier and symbol period offsets. Robust results are obtained even with differing IQ symbol cluster sizes and unequal symbol distributions.

In accordance with one of the various embodiments of the invention, a method to demodulate an unknown signal with an unknown linear modulation, comprises: sampling the unknown signal at a sampling rate to produce a sampled signal; applying carrier frequency offset estimation to the sampled signal to match the frequency of the sampled signal to that of the unknown signal and to change constellation rotation of the sampled signal; utilizing symbol period estimation to match the sampling rate of the sampled signal to a sampling rate of the unknown signal; applying blind equalization to the sampled signal to provide an equalized unknown signal; and demodulating the equalized unknown signal by utilizing a multistep windowed histogram clustering algorithm to generate constellation clusters; applying a rotation rate estimation algorithm to the clusters to estimate a phase rotation rate; and utilizing the phase rotation rate estimate to de-rotate the clusters.

In accordance with one of various embodiments of invention, a method for signal demodulation comprises: sampling a received signal at a first predetermined rate to produce a sampled signal; applying carrier frequency offset estimation to the sampled signal to match frequency of the sampled signal and to change constellation rotation of the sampled signal; utilizing symbol period estimation to match a sampling rate of the sampled signal; applying blind equalization to the sampled signal to remove channel distortion and applied transmitter filtering; utilizing a windowed histogram algorithm to generate constellation clusters from the sampled signal; applying a rotation rate estimation algorithm to the clusters to estimate phase rotation rate; and derotating the clusters by utilizing the phase rotation rate estimate.

In accordance with one of various embodiments of the invention, a receiver, comprises: a sampling stage receiving a received signal and sampling the received signal at a first predetermined rate to produce a sampled signal; and a demodulator. The demodulator is operable to: apply carrier frequency offset estimation to the sampled signal to match the frequency of the sampled signal and to change constellation rotation of the sampled signal; utilize symbol period estimation to match a sampling rate of the sampled signal; apply blind equalization to the sampled signal to remove channel distortion and applied transmitter filtering; utilize a windowed histogram algorithm to generate constellation clusters; apply a rotation rate estimation algorithm to the clusters to estimate phase rotation rate; and de-rotate the clusters by utilizing the phase rotation rate estimate, wherein the demodulator utilizes the de-rotated clusters to demodulate the received signal.

The features, functions, and advantages that have been discussed can be achieved independently in various embodiments of the present invention or may be combined in yet other embodiments further details of which can be seen with reference to the following description and drawings.

BRIEF DESCRIPTION OF THE DRAWINGS

The features, functions, and advantages of the disclosure can be achieved independently in various embodiments of the present disclosure or may be combined in yet other embodiments further details of which can be seen with reference to the following description and drawing figures in which, like reference designators identify like elements, and in which.

DETAILED DESCRIPTION

The following description of the various preferred embodiment(s) is merely exemplary in nature and is in no way intended to limit the present disclosure, its application, or uses.

Figure 1:
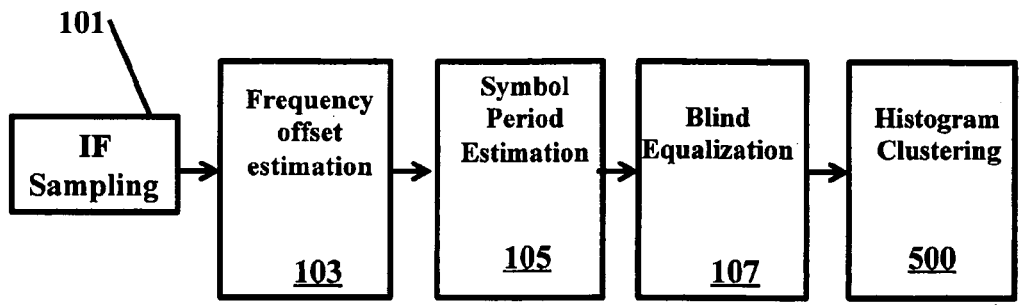
FIG. 1 is an illustration of a blind receiver processing sequence performed by one embodiment.

Consider a signal model of the output of IF sampling from 101 of FIG. 1 as given:

$$y(n) = A \sum_{l=-\infty}^{\infty} x(l)h(nT - lT + \varepsilon T)\exp(j2\pi f_e T + \theta_l) + g(n)$$

In the foregoing model, n=1, . . . , N; A is the unknown amplitude, T is the symbol period; g(n) is the additive noise, $\varepsilon$ represents the symbol sampling timing error; $f_e$ is the uncorrected frequency carrier offset, $\theta_l$ is the phase error; and $h(\bullet)$ is the convolved channel model and transmitter filter (or the portion of the transmitter filter that has not been taken out of the sampled signal). The N samples referred to may be one block of a much longer sampled signal. The method of the present disclosure is applied to each block of the original signal and the above model refers to one such signal block.

A method for blind constellation identification, in the embodiment of the disclosure, utilizes several steps as illustrated in FIG. 1.

Carrier frequency offset estimation 103 is applied to a received signal that is sampled by IF sampling 101. This is used in order to match the receiver frequency to the transmitter frequency and, in terms of the constellation, changes the constellation rotation from fast to slow.

Symbol period estimation 103 is then used in order to match the receiver sampling rate of the sampling step 101 to the transmitter sampling rate. This is used ahead of the following equalization step 107 in order to match the equalization samples to the transmitted samples.

Figure 2:
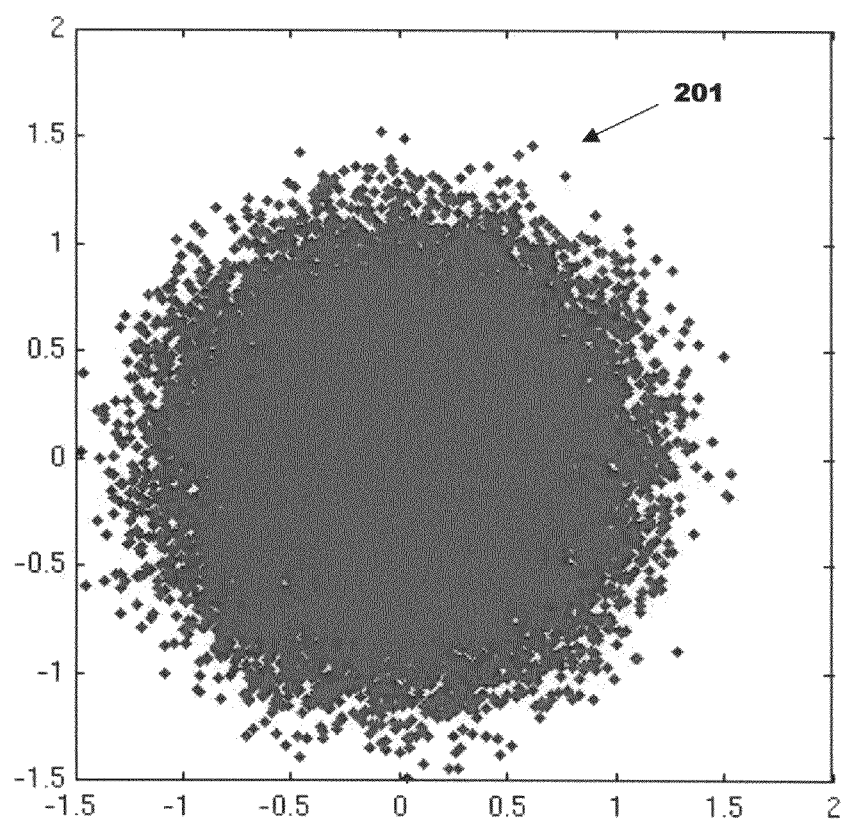
FIG. 2 is a plot of a signal input before equalization.

Next, blind equalization 107, using for example, the constant modulus algorithm (CMA) is applied to the original signal to remove a fair amount of the channel distortion and applied transmitter filtering. If this process succeeds, the constellation typically has discernible peaks in amplitude. An example of this is shown in FIG. 2 and in FIG. 3 which show, respectively, the signal constellation 201 before equalization and the signal constellation 301 after blind equalization showing the carrier offset. Carrier offset has an effect on the resulting equalized signal which causes the constellation 301 to rotate, so that individual constellation points are not distinguished when the entire data set is plotted.

Figure 5:
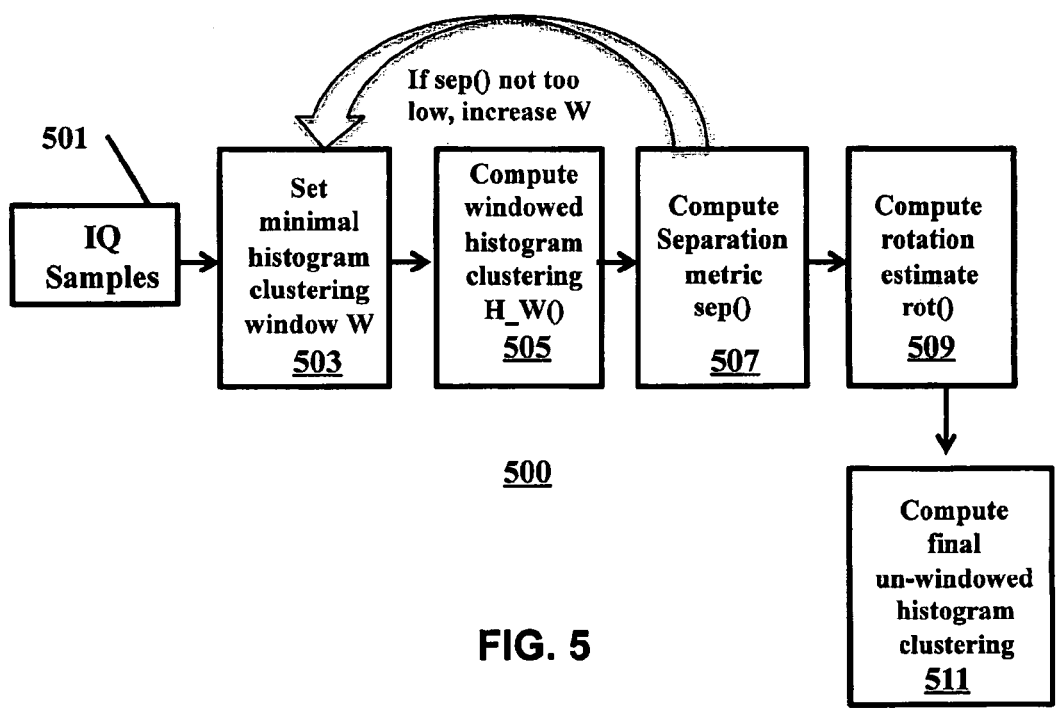
FIG. 5, which is on the same sheet as FIG. 1, is an illustration of a multistep windowed histogram clustering algorithm performed by one embodiment.
Figure 3:
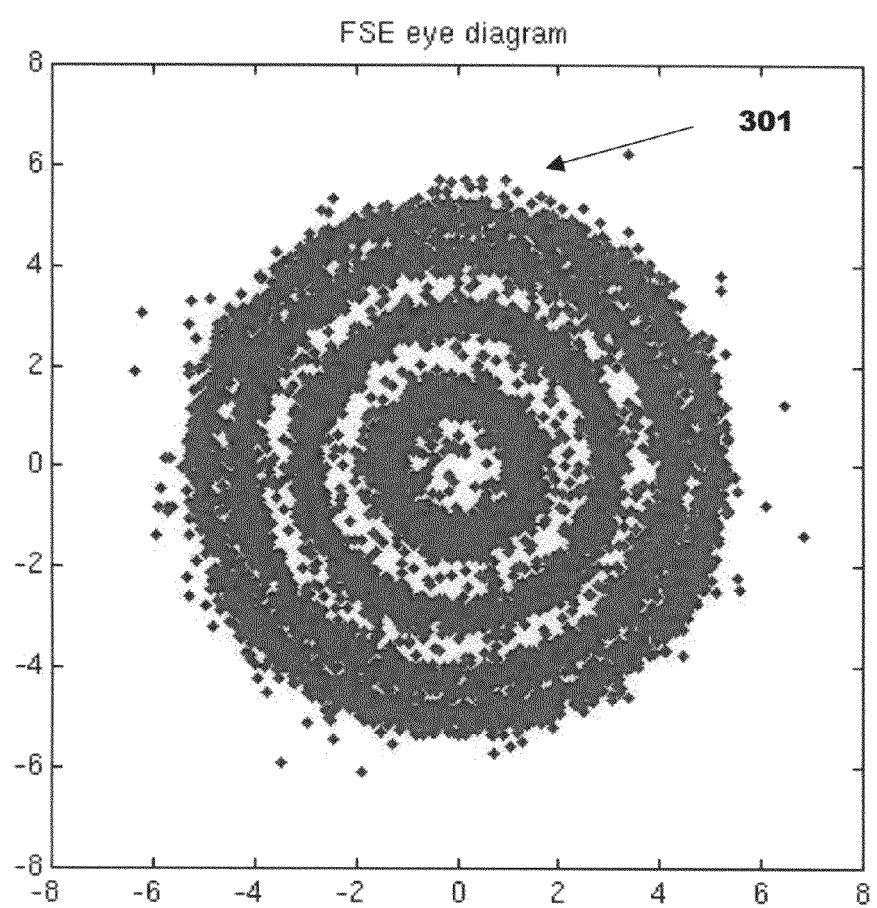
FIG. 3 is a plot of the signal of FIG. 2 after blind equalization.
Figure 4:
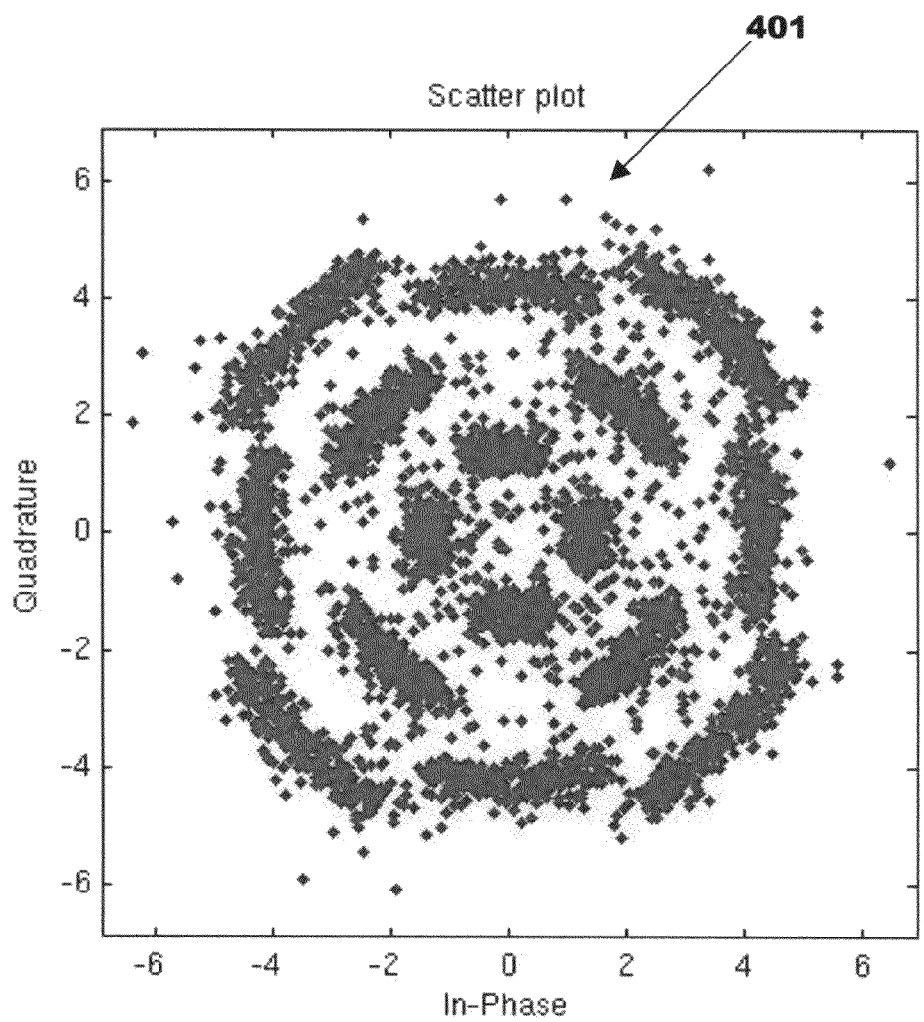
FIG. 4 is a plot of a partial signal after blind equalization.

If only a portion of the entire data is plotted, the constellation points do stand out as rotated point clouds as shown in the constellation 401 of FIG. 4. If there are only a small number of constellation point amplitudes, these might show up as full circles of points as in FIG. 3 when the constellation 301 is rotating. If however, there are a number of different amplitudes and few constellation points share the same amplitude, the picture becomes less well defined. In accordance with the embodiment of the disclosure a windowed histogram $H_W(C)$ 505 and a separation metric sep($\bullet$) 507 are introduced as part of a multistep windowed histogram clustering algorithm 500 illustrated in FIG. 5. These are described in detail herein below. The computation sep($H_W(C)$) gives a metric that can be used to set the length B of the time window W so that the constellation rotates enough to measure the rotation precisely, but not so much that the histogram clusters overlap, as is shown in FIG. 3.

In the embodiment of the disclosure, a rotation rate estimation rot($\bullet$) 509 is applied to each cluster resulting from the histogram clustering algorithm. More specifically, a rotation rate estimation algorithm is applied to all the clusters simultaneously, since all these estimates of phase rotation should be similar and using the overall set provides a better estimator. The constellation is then de-rotated using this phase rotation rate estimate. The previous windowed histogram clustering and de-rotation can be reapplied for a longer window should this be necessary, i.e. the steps can be iterated to improve the results.

In the embodiment, a final (not windowed) histogram clustering 511 of the entire N sample data block is done and the final symbol decisions are then made.

A basic processing sequence for blind signal demodulation is illustrated in FIG. 1.

Blind frequency estimation is usually a matter of using a sliding window Fast Fourier Transform FFT to estimate the more prevalent frequency contained within the input signal. This estimate does not involve knowledge of the symbol timing, symbols, or transmitter filters. However, it can involve knowledge of the channel because of Doppler effects.

Frequency estimation 103 transforms the raw IF reception x(t) in samples from an analog/digital A/D sampler 101 output into an IF version with "nearly" zero carrier frequency offset. The small error in this estimate has the effect of causing the constellation to rotate slowly over time. This finer estimate is performed at a later step in the process.

Symbol period estimation 105 is used after carrier frequency estimation, but before equalization. Out of this process will come an estimate of symbol period, T. This will, in turn, typically be used to resample the signal at a T/2 rate so that a standard T/2 equalizer can be applied. The symbol sample phase is still unknown at this stage and will be taken care of by blind equalization 107.

Equalization transforms the T/2 sampled signal into a T sampled signal at the estimated symbol rate. The goal of this process is to try and remove both the (potentially) unknown transmitter filter (such as a square root raised cosine filter) and the (usually) unknown channel distortion modeled as a filter.

Either the constant modulus algorithm (CMA) and its many variants or a subspace algorithm are usually chosen for equalization of linear modulation types such as PSK and QAM. At the end of this equalization 107, the input sequence x(t) is transformed into an equalized sequence y(t).

Figure 6:
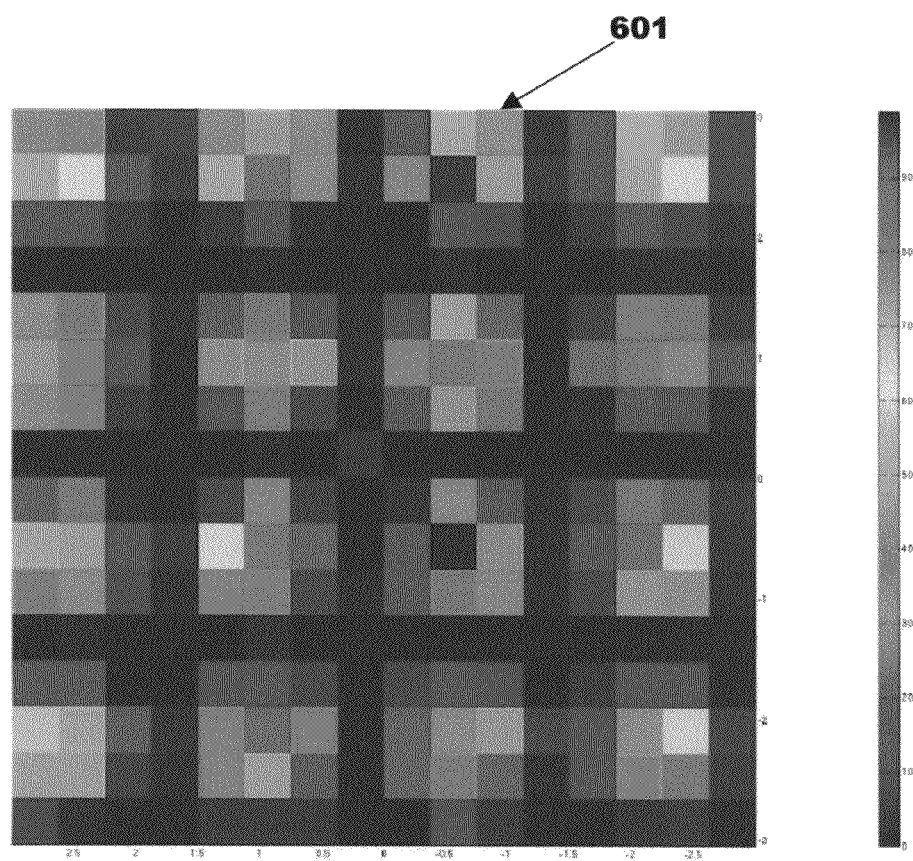
FIG. 6 is a 2D histogram.

Histograms provide a direct intuitive way of seeing where clustering is taking place in IQ space. A 32×32 2D histogram 601 is shown in FIG. 6 for an equalized signal vector y(t) for a 16-QAM signal.

Figure 7:
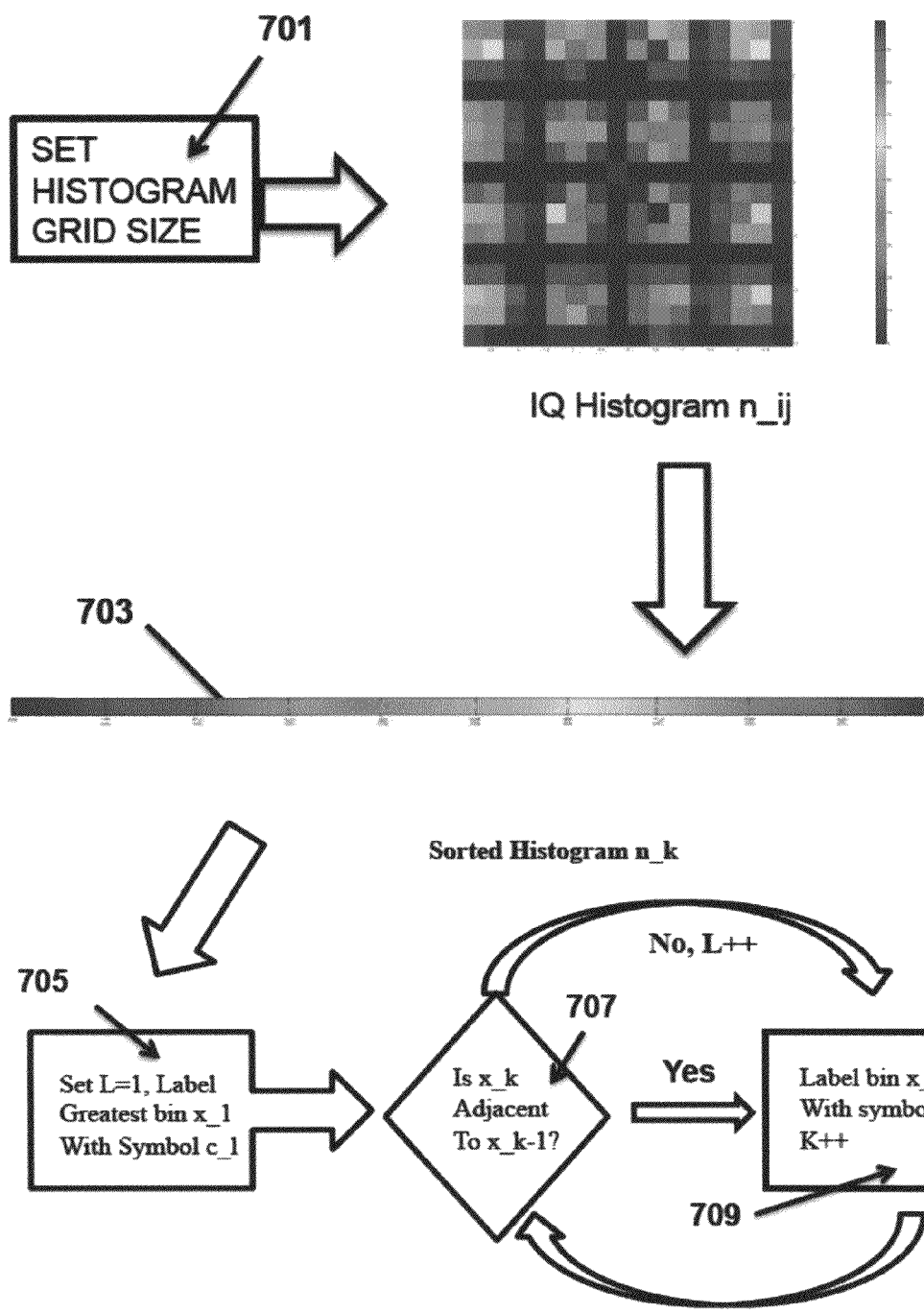
FIG. 7 is an illustration of operations for a histogram clustering algorithm performed by one embodiment.

A histogram clustering method utilized in the embodiment, shown in FIG. 7, is as follows: Let $n_{ij}$ be the 2D histogram of the IQ pairs for N samples, where $x_{ij}$ is the corresponding rectangular area within IQ space where each $n_{ij}$ is being counted. Let $n_k$ be these values (k=1, 2, . . . , P) sorted into a 1D array from highest to lowest, with $x_k$ the corresponding rectangular area.

Let $\{c_i | i=1, 2, \ldots, m\}$ be the labels for M constellation points. A priori, both M and the constellation points are not known. Then the histogram clustering algorithm proceeds as follows:

First, the grid size is selected at 701 by creating a (typically)

$$\alpha\sqrt[4]{N} \times \alpha\sqrt[4]{N}$$

grid for histogramming where α is some small scalar value, typically 1-2.

Next an IQ histogram 601 is computed on this grid size resulting in $\{n_{ij}\}$ for bins $\{x_{ij}\}$.

The histogram is sorted at 703 resulting in $\{n_k\}$ for $\{x_k\}$.

Symbol label pointer L is set so that L=1 at step 705. For k=1, all points in $x_1$ are labeled with $c_L$.

At steps 707, 709 for k=2, 3, ..., P: (a) If $x_k$ is not adjacent (either horizontally, vertically or diagonally) to $x_{k-1}$, set L=L+1; and (b) Label all points in $x_k$ with $c_L$.

The above-described algorithm is parameter-less. It works well, even when clustering both cells with large populations together with small population cells. This is because it does not depend on defining clusters by thresholds, but rather segments based on nearness to existing clusters.

In the above-described histogram clustering algorithm, the histogram is applied to the entire set of N samples of the equalized symbol rate signal. As long as the carrier frequency estimate, symbol period estimate and equalization were all done nearly perfectly, this would be a reasonable step to apply to the entire signal set. However, each of these processes has errors associated with it and these directly affect the clustering of the symbols.

An uncorrected carrier frequency offset causes the entire constellation to rotate. While it is assumed that "most" of the carrier offset has been taken out, the residual can cause complete failure when doing histograms on long data sets. Measuring the fine constellation rotation is necessary to undo the final residual carrier offset.

An uncorrected symbol period error cause poorer results of the equalization resulting in constellation spread similar to constellation rotation.

In the embodiment, windowed histograms are used to evaluate finer estimates of carrier offset and symbol period offset and the equalization is redone, resulting in tighter constellation points. The above-described histogram clustering is modified by incorporating a sliding windowed histogram to estimate these effects.

Beginning with a windowed histogram size of B samples (B≦N) where the histogram bin size is $$2 \times 2 = \alpha\sqrt[4]{B} \times \alpha\sqrt[4]{B},$$

the 2D histogram algorithm is run, the clusters are labeled, and the original data is modified by de-rotating using the phase rotation rate estimate described below.

The histogram size is stepped up, for example, by multiplying by 2 or adding B to the window size and computing the proper bin size in each dimension; and the original data is modified by de-rotating using the phase rotation rate estimate described below. This step is then iterated until there is no further improvement in the separation metric sep(•). The separation metric sep(•) measures how tightly clustered the constellation is and can be done by computing a normalized standard deviation of the sorted histogram bin sizes.

The histogram technique results in a match of data points to constellation points. The overall rotation rate of each constellation point can be estimated (the rot(•) estimation function) by computing a linear regression for all sample points $y_j$ within each constellation point cluster on $\theta_j = \tan^{-1}(\text{imag}(y_j)/\text{real}(y_j))$. Thus if the original signal is multiplied by $e^{-2\pi i \phi j}$ where φ is the slope of this regression scaled in samples, then the data points can be de-rotated to get constellations that have a tight clustering near the symbol locations. Note that, if desired, a final fixed rotation by multiplying by a scalar will make the constellation square with respect to the IQ axis.

Figure 8:
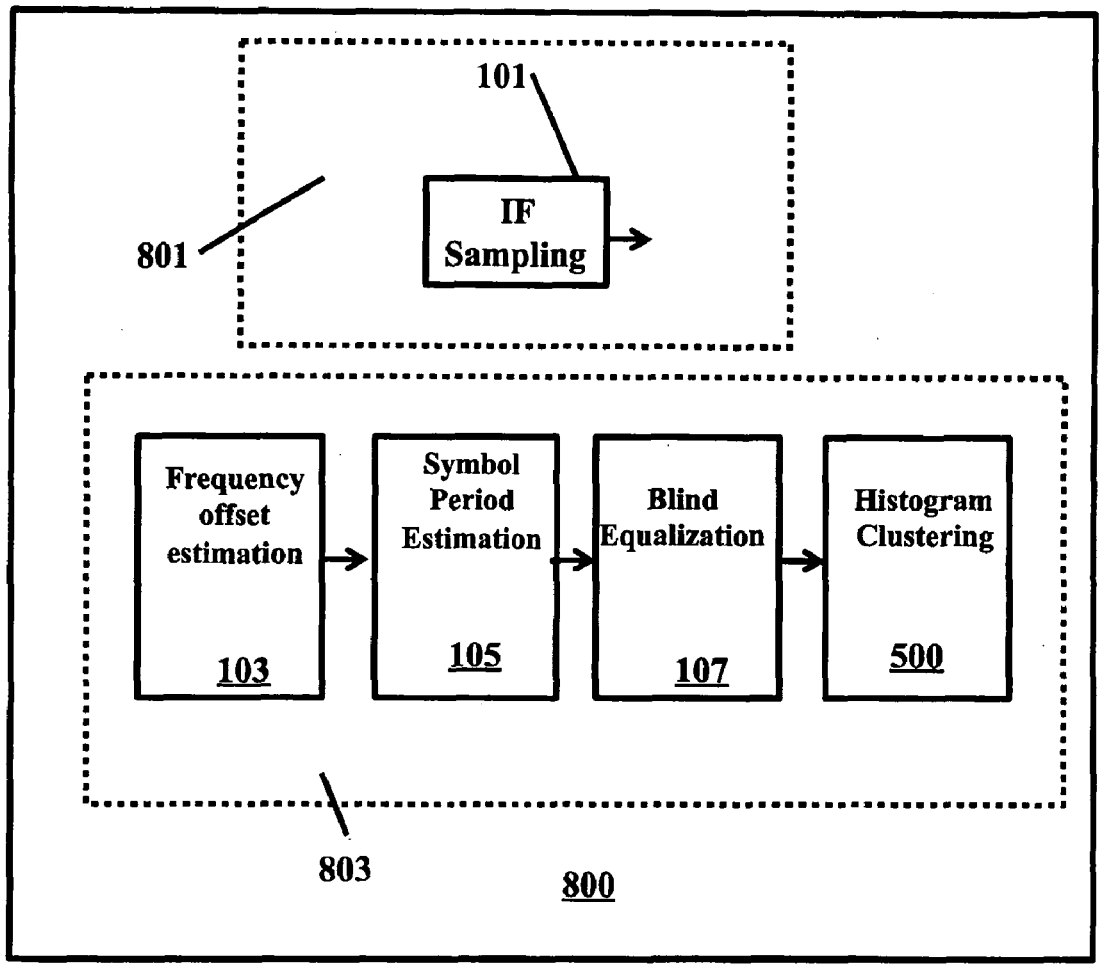
FIG. 8 is a block diagram illustration of an advantageous embodiment of a receiver.

A receiver may be implemented utilizing the method of the embodiments. Receiver 800 shown in FIG. 8 includes a sampling stage 801 and a demodulator 803. Operation of the demodulator 803 is as described with respect to FIGS. 1 and 5.

The blind constellation identification approach of the embodiment has several advantages over existing approaches. The approach of the embodiment has no thresholds or other parameters to set; it has the ability to adapt to unknown carrier offset and unknown symbol period offset; and it is robust to differing cluster sizes and unequal symbol distributions within IQ space where the constellation resides.

While various embodiments have been described, those skilled in the art will recognize modifications or variations which might be made without departing from the scope of the invention. The examples illustrate the various embodiments and are not intended to limit the present disclosure. Therefore, the description and claims should be interpreted liberally with only such limitation as is necessary in view of the pertinent prior art.

What is claimed is:

1. A method to demodulate an unknown signal with an unknown linear modulation, the method comprising:
    sampling said unknown signal at a sampling rate to produce a sampled signal;
    applying carrier frequency offset estimation to said sampled signal to match the frequency of said sampled signal to that of said unknown signal and to change constellation rotation of said sampled signal;
    utilizing symbol period estimation to match said sampling rate of said sampled signal to a sampling rate of said unknown signal;
    applying blind equalization to said sampled signal to provide an equalized unknown signal; and
    demodulating said equalized unknown signal by utilizing a multistep windowed histogram clustering algorithm to generate constellation clusters, wherein:
said multistep windowed histogram clustering algorithm comprises:
    (a) setting a minimal histogram clustering window;
    (b) computing windowed histogram clustering;
    (c) computing a separation metric to set the length of a time window for rotation of said constellation; and
    (d) incrementally increasing a size of the histogram clustering window until the separation metric shows no further improvement
    applying a rotation rate estimation algorithm to said clusters to estimate a phase rotation rate; and
    utilizing said phase rotation rate estimate to de-rotate said clusters.

2. The method of claim 1, comprising:
    computing a rotation rate estimate to provide an estimated phase rotation for derotating said constellation.

3. The method of claim 2, comprising:
derotating said constellation utilizing said estimated phase rotation.

4. The method of claim 1, comprising:
computing a rotation rate estimate subsequent to determining that said separation metric shows no further improvement.

5. The method of claim 4, comprising:
computing a final un-windowed histogram clustering subsequent to said step of computing a rotation rate estimate for demodulating said unknown signal.

6. A method for signal demodulation, the method comprising:
sampling a received signal at a first predetermined rate to produce a sampled signal;
applying carrier frequency offset estimation to said sampled signal to match the frequency of said sampled signal and to change constellation rotation of said sampled signal;
utilizing symbol period estimation to match a sampling rate of said sampled signal;
applying blind equalization to said sampled signal to remove channel distortion and applied transmitter filtering;
utilizing a multistep windowed histogram algorithm to generate constellation clusters from said sampled signal wherein:
said multistep windowed histogram clustering algorithm comprises:
 (a) setting a minimal histogram clustering window;
 (b) computing windowed histogram clustering;
 (c) computing a separation metric to set the length of a time window for rotation of said constellation; and
 (d) incrementally increasing a size of the histogram clustering window until the separation metric show no further improvement.
applying a rotation rate estimation algorithm to said clusters to estimate phase rotation rate; and
derotating said clusters by utilizing said phase rotation rate estimate.

7. The method of claim 6, comprising:
providing said symbol period estimation step after carrier frequency estimation step, but before said blind equalization step.

8. The method of claim 7, comprising:
utilizing said symbol estimation step to provide an estimate of a symbol period of said received signal.

9. The method of claim 8, comprising:
resampling said signal at a second predetermined rate based on said estimated symbol period.

10. The method of claim 9, comprising:
utilizing said blind equalization step to transform said signal resampled at said second predetermined rate into a sampled signal at said estimated symbol period rate.

11. A receiver, comprising:
a sampling stage receiving a received signal and sampling said received signal at a first predetermined rate to produce a sampled signal; and
a demodulator, said demodulator being operable to:
 apply carrier frequency offset estimation to said sampled signal to match the frequency of said sampled signal and to change constellation rotation of said sampled signal;
 utilize symbol period estimation to match a sampling rate of said sampled signal;
 apply blind equalization to said sampled signal to remove channel distortion and applied transmitter filtering;
 utilize a multistep windowed histogram algorithm to generate constellation clusters wherein:
said multistep windowed histogram clustering algorithm comprises:
 (a) setting a minimal histogram clustering window;
 (b) computing windowed histogram clustering;
 (c) computing a separation metric to set the length of a time window for rotation of said constellation; and
 (d) incrementally increasing a size of the histogram clustering window until the separation metric show no further improvement,
apply a rotation rate estimation algorithm to said clusters to estimate phase rotation rate; and
de-rotate said clusters by utilizing said phase rotation rate estimate, wherein said demodulator utilizes said de-rotated clusters to demodulate said received signal.

12. The receiver of claim 11, wherein:
said demodulator provides said symbol period estimation step after carrier frequency estimation step, but before said blind equalization step.

13. The receiver of claim 12, wherein:
said demodulator utilizes said symbol estimation step to provide an estimate of symbol period of said received signal.

14. The receiver of claim 13, wherein:
said demodulator controls said sampling stage such that said sampling stage resamples said received signal at a second predetermined rate based on said estimated symbol period.

15. The receiver of claim 14, wherein:
said demodulator utilizes said blind equalization to transform said signal resampled at said second predetermined rate into a sampled signal at said estimated symbol period rate.

* * * * *